United States Patent [19]
Leonard et al.

[11] Patent Number: 5,588,669
[45] Date of Patent: Dec. 31, 1996

[54] COVER ATTACHMENT FOR AN AIR BAG MODULE

[75] Inventors: Timothy J. Leonard, Stuttgart, Germany; Kurt E. Kottke, Bountiful, Utah

[73] Assignee: Morton International, Inc., Chicago, Ill.

[21] Appl. No.: 429,380

[22] Filed: Apr. 26, 1995

[51] Int. Cl.⁶ .................................................. B60R 21/16
[52] U.S. Cl. ........................................ 280/728.3; 280/732
[58] Field of Search ............................ 280/728.1, 728.2, 280/728.3, 732, 752

[56] References Cited

U.S. PATENT DOCUMENTS

| | | | |
|---|---|---|---|
| 3,966,227 | 6/1976 | Cameron | 280/752 |
| 4,327,937 | 5/1982 | Scholz et al. | 280/732 |
| 4,373,745 | 2/1983 | Matsuno | 280/752 |
| 4,752,084 | 6/1988 | Kawasaki et al. | 280/752 |
| 4,915,410 | 4/1990 | Bachelder | 280/732 |
| 4,989,897 | 2/1991 | Takada | 280/728.3 |
| 5,031,930 | 7/1991 | Sato | 280/732 |
| 5,058,919 | 10/1991 | Paquette et al. | 280/732 |
| 5,060,971 | 10/1991 | Nanbu et al. | 280/728.3 |
| 5,072,967 | 12/1991 | Batchelder et al. | 280/732 |
| 5,092,627 | 3/1992 | Igawa | 280/728.2 |
| 5,135,252 | 8/1992 | Suran et al. | 280/732 |
| 5,141,247 | 8/1992 | Barth | 280/728.2 |
| 5,167,427 | 12/1992 | Baba | 280/728.3 |
| 5,186,492 | 2/1993 | Wright et al. | 280/728.2 |
| 5,201,541 | 4/1993 | Jones et al. | 280/731 |
| 5,217,253 | 6/1993 | Pray | 280/732 |
| 5,261,693 | 11/1993 | Krickl et al. | 280/732 |
| 5,275,432 | 1/1994 | Pray et al. | 280/728 A |
| 5,277,442 | 1/1994 | Ceuvas | 280/731 |
| 5,280,946 | 1/1994 | Adams et al. | 280/728.2 |
| 5,284,358 | 2/1994 | Rhein | 280/728.2 |
| 5,284,359 | 2/1994 | Baba | 280/743.1 |
| 5,297,813 | 3/1994 | Baba et al. | 280/743.1 |
| 5,303,951 | 4/1994 | Goestenkors et al. | 280/728.3 |
| 5,310,213 | 5/1994 | Mori | 280/728.2 |
| 5,312,129 | 5/1994 | Ogawa | 280/728.2 |
| 5,316,822 | 5/1994 | Nishijima et al. | 428/138 |
| 5,342,090 | 8/1994 | Sobczak et al. | 280/732 |
| 5,354,093 | 10/1994 | Schenck et al. | 280/728.2 |
| 5,383,681 | 1/1995 | Sato | 280/728.3 |
| 5,456,488 | 10/1995 | Bauer | 280/732 |
| 5,482,313 | 1/1996 | Ikeya et al. | 280/728.2 |

FOREIGN PATENT DOCUMENTS 94-63964  10/1995  Japan ................. 280/728.3

*Primary Examiner*—Paul N. Dickson
*Attorney, Agent, or Firm*—Taylor J. Ross; Gerald K. White

[57] ABSTRACT

An air bag cover attachment includes a housing formed by extrusion. The housing includes a section for receiving a gas generator, and a pair of spaced parallel side walls which define a storage area for the uninflated cushion. The free ends of the side walls include flanges which are notched to form a series of mounting tabs. The cover includes a depending skirt having slots which mate with the tabs. The strength of the extruded tabs permits the tabs and slots, with no other fastener, to secure the cover to the housing. The slots are oversized to permit the cover to float with respect to the housing. The cover also includes a set of placement tabs extending from the skirt. The placement tabs secure the cover to the dashboard in the proper position. The oversized slots and separate placement tabs ensure that the decorative cover is mounted on the dashboard in the proper position by absorbing tolerance buildup in the housing and housing position. The use of tabs and slots also permits the cover to be secured to the housing and mounted to the dashboard using only a translational pressing motion. This arrangement also permits the cover to be attached to the housing either before or after the housing is mounted behind the dashboard.

18 Claims, 1 Drawing Sheet

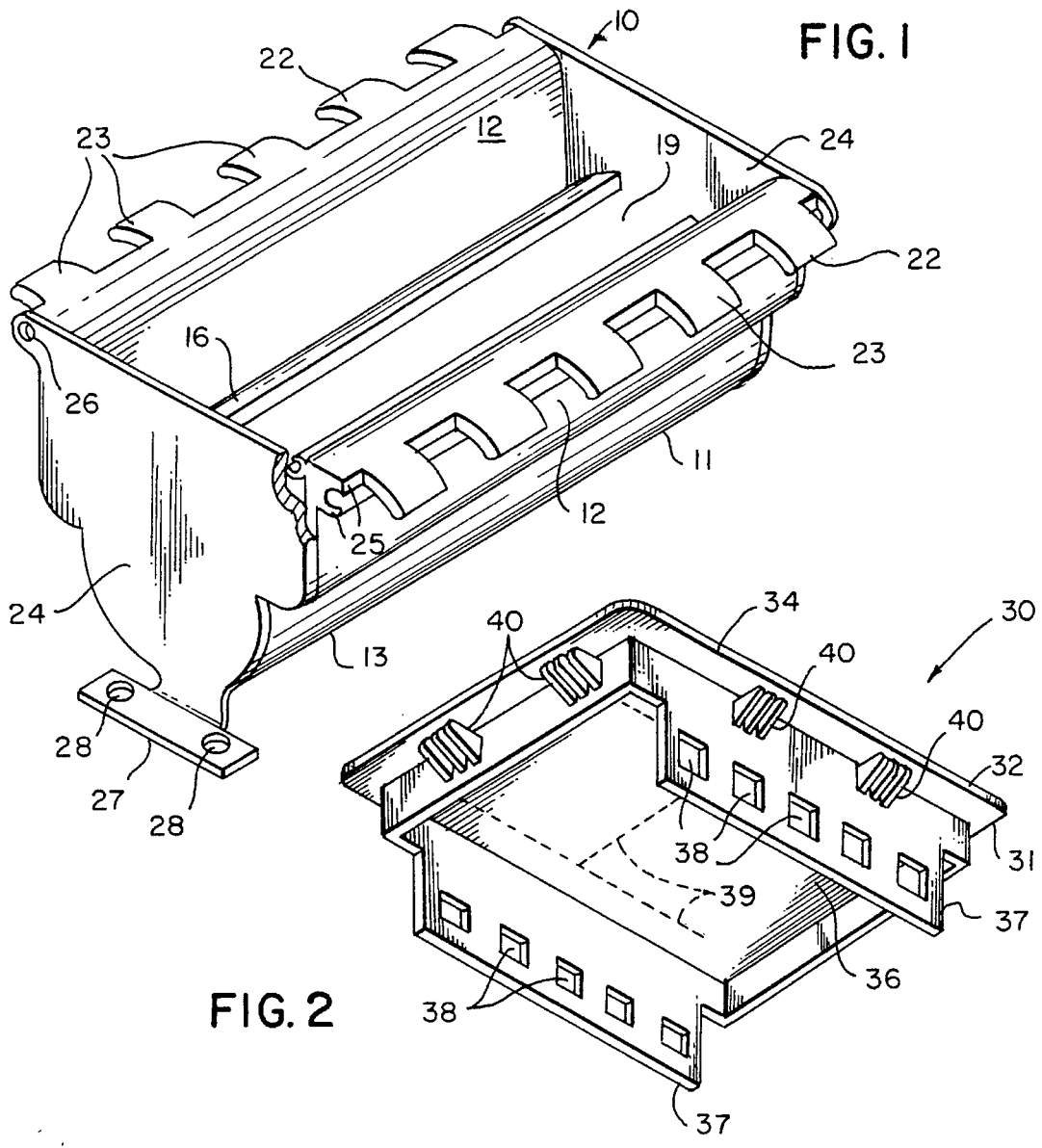
FIG. 1
FIG. 2
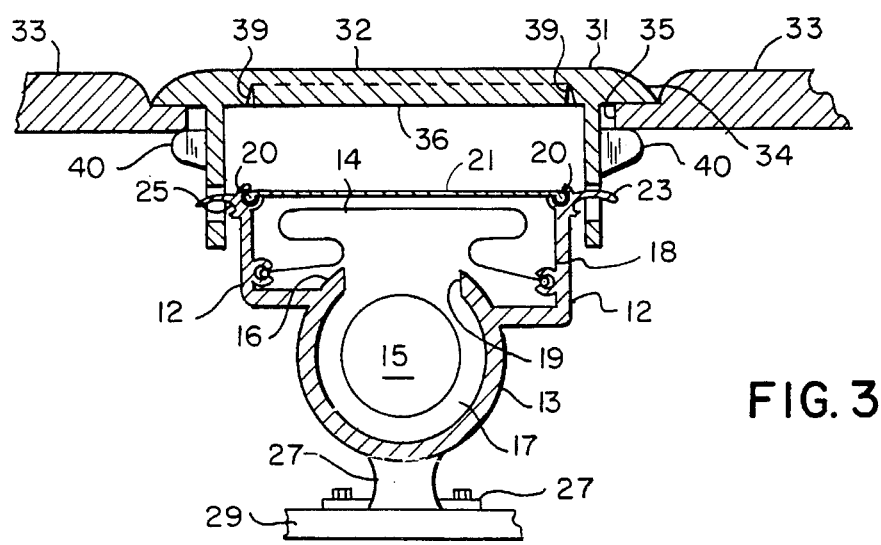
FIG. 3

5,588,669

COVER ATTACHMENT FOR AN AIR BAG MODULE

BACKGROUND OF THE INVENTION

1. Field of the Invention

The present invention relates in general to air bag modules for vehicle safety. In particular, the present invention relates to an improved attachment arrangement for securing a decorative cover to the air bag housing and surrounding dashboard.

2. Description of the Related Art

Air bag passive restraint systems have gained increasing popularity in recent years. Such systems typically include one or more modules mounted within the passenger compartment of a vehicle. These modules include a gas generator, an inflatable cushion to receive the gas in the event of a collision, and a cover to prevent damage to the cushion prior to use.

It has become common to provide the cover as a decorative member which forms a part of the dashboard, steering wheel, seat, door, roof, etc. of the vehicle. Such covers include a frangible section, typically having reduced strength tear lines, to permit a section of the cover to move and allow the inflating bag to expand past the cover. The frangible section must of course be sufficiently strong to resist accidental opening prior to a collision. The strength of the frangible section therefore requires that relatively large forces be placed on the cover by the inflating bag before the frangible section releases. This creates a danger that the force will cause the entire cover to be torn from the dashboard, possibly striking the passenger.

As such, the cover must be securely attached to one or both of the dashboard and the air bag housing. While some dashboards may be sufficiently rugged to provide an attachment point for the cover, it is typically preferred to attach the cover to the air bag housing, which is in turn securely connected to a structural member of the vehicle behind the dashboard. The need for strength in the connection between the cover and the housing has often resulted in complicated connection schemes.

An example of this is shown in U.S. Pat. No. 5,186,492 to Wright et al. In the arrangement of Wright the cover includes flanges which are riveted to the housing. This riveting process is of course time consuming and costly. U.S. Pat. No. 5,383,681 to Sato shows cover flanges which include tabs to mate with slots in the housing. However, Sato then places a reinforcement plate over the flanges and rivets through the plates and flanges, using even more material, adding more weight, and increasing the number of assembly steps.

A further problem with these prior art connections is that the cover is rigidly fixed with respect to the housing. As noted above, the housing is typically secured to a structural member behind the dashboard. If the cover is rigidly fixed to the housing, the cover is therefore rigidly fixed to the structural member. Since the cover is typically intended to be a flush continuation of the dashboard, the size tolerances on the structural member, housing, cover and dashboard must all be very tight, or the cover will not have the proper flush placement.

This problem of cover positioning, as well as the problem of a complicated connection between the cover and housing, is partially addressed in U.S. Pat. No. 5,303,951 to Goestenkors et al. In this patent the housing is secured to a structural member, and is formed of sheet metal. Along both lateral edges there are provided several tabs, struck from the sheet metal on one edge and formed by bending the sheet metal on the other edge. The cover has a depending skirt with slots for mating with the sheet metal tabs. On a first of the lateral edges these slots are oversized to permit the cover to float with respect to the housing. To secure the cover, the depending skirt also includes tabs which engage the dashboard. In addition to the cover, the housing also engages the dashboard on the second of the lateral edges.

While this arrangement overcomes some problems of the prior art, numerous problems remain. For example, while this arrangement provides some relief from tolerance build-up causing cover positioning problems, these problems still remain on the second lateral edge of the cover, which does not float. Furthermore, while riveting is not used, the relatively low strength of struck or bent sheet metal tabs to secure the cover causes safety concerns. Additionally, while the tabs and slots do not require riveting, there is a complicated translation-rotation motion required to secure the cover to the housing. Beyond this, a complex translation-rotation movement is also required to secure the module to the dashboard. Finally, this arrangement requires that the cover be secured to the housing before this completed module is attached to the dashboard.

SUMMARY OF THE INVENTION

An object of the present invention is to provide an air bag arrangement in which the cover is safely and securely attached to the air bag housing.

Another object of the present invention is to provide an air bag cover attachment which results in a flush placement of the cover in the dashboard.

A further object of the present invention is to provide an air bag cover attachment which is simple to install.

Yet another object of the present invention is an air bag cover arrangement in which the cover is secured in place with only translational movement.

Another object of the present invention is to provide a cover attachment which employs only mating tabs and slots without further fasteners.

Yet another object of the present invention is to provide a cover attachment in which the cover is secured to both the air bag housing and the dashboard.

These and other objects are achieved by an air bag cover attachment according to the invention. The air bag module includes a housing formed by extrusion. The housing includes a section for receiving a gas generator, and a pair of spaced parallel side walls which define a storage area for the uninflated cushion. The free ends of the side walls include flanges which are notched to form a series of mounting tabs. The cover includes a depending skirt having slots which mate with the tabs. The strength of the extruded tabs permits the tabs and slots, with no other fastener, to secure the cover to the housing. The slots are oversized to permit the cover to float with respect to the housing. The cover also includes a set of placement tabs extending from the skirt. The placement tabs secure the cover to the dashboard in the proper position. The oversized slots and separate placement tabs ensure that the decorative cover is mounted on the dashboard in the proper position by absorbing tolerance buildup in the housing and housing position. The use of tabs and slots also permits the cover to be secured to the housing and mounted to the dashboard using only a translational pressing motion. This arrangement also permits the cover to be attached to the housing either before or after the housing is mounted behind the dashboard.

BRIEF DESCRIPTION OF THE DRAWINGS

The objects and features of the invention noted above are explained in more detail with reference to the drawings, in which like reference numerals denote like elements, and in which:

FIG. 1 is a perspective view in partial cut-away of a housing according to the present invention;

FIG. 2 is a perspective view of a cover according to the present invention; and

FIG. 3 is a cross-sectional view showing the housing and cover mounted to a dashboard.

DETAILED DESCRIPTION OF THE INVENTION

With reference to FIG. 1, an air bag housing according to the present invention is generally designated by reference numeral 10. The housing 10 includes a central section 11 formed of extruded aluminum, with the central section having a longitudinal axis parallel to the direction of extrusion. The central section will typically have a generally U-shaped cross-section, best shown in FIG. 3, with a pair of upstanding sidewalls 12 and a crossbar 13.

Between the upstanding sidewalls of this U shape will be mounted at least an air bag cushion 14 (FIG. 3), and typically also a gas generator 15 operatively connected to the cushion 14, with both being shown schematically for clarity. The particular shape of the cushion when inflated, or its folding in the stored condition are not believed to be critical, and may take any compatible form which will be received within the housing. Similarly, any compatible form of gas generator may be used in the present invention. As intimated above, the gas generator need not be present within the housing, so long as it is operatively connected to the cushion 14 which is in the housing.

In the embodiment shown, the housing includes a dividing wall 16 extending across the U shape. The dividing wall 16 in this embodiment has a downward curvature and serves, together with the cross-bar 13 to form a cylindrical generator chamber 17. The generator 15 may be mounted in this chamber (in those cases where the generator is within the housing). The dividing wall 16 also serves to form a cushion cavity 18 between the upstanding sidewalls. In order to operatively connect a generator 15 in the chamber 17 with a cushion 14 in the cavity 18, the dividing wall may have a cushion opening 19 cut therethrough. The opening may permit the cushion to pass into the cavity 18 for connection with the generator, or the cushion may be connected to the housing (such as the dividing wall) with the opening acting simply as a gas passage.

An advantageous arrangement for operatively retaining the cushion is shown in the figures, where the opening 19 is formed as a slit produced by extrusion which extends the entire length of the central section 11. On the interior face of each sidewall there is extruded a slit in the form of a section of a cylinder having an arcuate extent greater than 180 degrees. The slits each receive a throat flap of the cushion, which is retained by being wrapped about a rod held within the slot, as shown in copending U.S. patent application Ser. No. 08/289,868.

The laterally interior faces of the sidewalls 12 may also include appropriate extruded slots 20, channels, ribs, etc. to mount a transport cover 21. Such a transport cover can be mounted to the housing to protect the cushion during transport to the site of assembly of the housing to the vehicle. The transport cover may be formed of a plastic panel having reduced strength tear lines (preferably one, longitudinally centered) and enlarged lateral edges appropriately shaped in cross-section for engagement with the slots, ribs, etc. During inflation, the expanding cushion will sever the cover 21 at the tear line to permit further expansion of the cushion.

Each of the sidewalls also includes, adjacent its free end, a laterally extending tab flange 22. The flanges are formed during the extrusion and are thus a monolithic extension of the housing. At spaced points along the longitudinal length of each flange, notches are cut out of the flange to leave a series of longitudinally spaced mounting tabs 23. The tabs 23 are thus still a monolithic extension of the housing. Additionally, the tabs have been maintained in their original extruded position, and have not been subject to striking, bending or other metal working processes, and thus substantially maintain the original mechanical properties of the extruded aluminum.

This is an important aspect of the present invention, as the metal working processes noted above tend to weaken most metals, and especially aluminum. While this weakening can be removed by subsequent heat treatment, this would of course add expense to the housing. As such, the present extrusion and notching method provides essentially no degradation in the strength of the tabs, while adding only minor costs (and possibly none in comparison to the striking or bending operations). Furthermore, the extrusion process permits the cross-section of the flanges 22, and thus the tabs 23 to be purposefully designed. Specifically, instead of simply having a constant thickness sheet of metal to strike or bend, the tabs can be designed with a greater thickness than that of the sidewalls, with stress reducing filets, etc. This ability to design the tab cross-section, along with the retention of original metal strength without additional heat treatment, combine to ensure that the tabs will be able to withstand the forces applied to them without failure, and at a reduced cost.

The central section 11, due to its formation by extrusion, is open at its longitudinal ends. To close the longitudinal ends of the cavity 17 and chamber 18, the housing 10 also includes a pair of endwalls 24. The endwalls are typically generally planar sheets of material (e.g., metal) which are secured to the longitudinal ends of the central section. To reduce the size of the housing, the endwalls preferably have a peripheral shape that generally corresponds to the cross-sectional outline of the central section, as shown in FIG. 1.

The endwalls may be secured to the central section by various methods, such as adhesives, welding, etc. The gas generator itself may also have a threaded member extending therefrom which may pass through the endwall and be secured with a nut. In the embodiment of FIG. 1, the outer face of the sidewalls 12 are provided with a pair of ribs 25 forming a slot in the form of a section of a cylinder. Each of the endwalls is provided with a through hole (not shown) at a position corresponding to the slot, and a screw 26 is inserted through this hole into engagement with the slot. As an alternative (not shown), the endwalls may be provided with a tab which is bent over to lie between the ribs 25 forming the slot. The ribs may then be deformed over the tab to hold the tab, and thus the endwall, in position.

It is also noted that the ribs 25 can be used to strengthen the mounting tabs 23. Specifically, and as shown in FIGS. 1 and 2, the uppermost rib 25 is located at the junction of the tab 23 and the sidewall 12. The rib therefore tends to make this junction thicker, and therefore stronger. Since the rib 25 would be formed anyway (for this type of attachment), this permits a strengthening of the tabs without additional weight or material costs, and possibly a reduction if this area would have been thickened without the presence of the rib. As an alternative arrangement, if the tab is found to be sufficiently strong without such thickening, the tab itself could form a portion of the uppermost rib 25.

The housing will also include means for securing the housing to the vehicle. This could be achieved by welding a bolt to the outer face of the central section at the appropriate position, or by drilling a hole through the central section and inserting the bolt therethrough. A preferred alternative, however, is to form a mounting flange 27 on one or both of the endwalls 24. In the embodiment shown, the flange 27 is further bent to properly present one or more through holes 28 through which a bolt or screw may pass to secure the flange to a structural member 29 (FIG. 3) on the vehicle.

A cover for use with the housing 10 is shown in FIG. 2, where it is generally designated by reference numeral 30. The cover 30 includes a main panel 31 which overlies the cavity 18 containing the cushion 14. The panel 31 has an outer face 32 which opposes the passenger and is typically a flush continuation of an interior cabin element 33 (FIG. 3) of a vehicle. This cabin element may take many forms, such as a steering wheel, seat, door, roof or dashboard. The outer face will therefore typically be a decorative face.

The panel 31 has a peripheral edge 34 which is typically rectangular, and which will typically be received within a corresponding depression in the cabin element so as to overlie and close an opening 35 in the cabin element. As shown in FIG. 3, the peripheral edge 34, while preferably received in a depression, will rest upon the cabin element for support. As such, the panel 31 will serve to prevent access to the opening 35. The main panel, however, will include a frangible section, discussed more fully below, which will allow at least a portion of the panel to be moved out of this overlying position.

The panel 31 also includes an interior face 36, opposite to the outer face. Mounted upon this inner face, and spaced peripherally inward from the edge 34 is a depending skirt 37. The skirt 37 is located such that it is in proximity to at least a substantial portion of the periphery of the opening 35 in the cabin element. Additionally, the skirt is located such that it will at least overlie the outer faces of the sidewalls 12 of the housing when in the assembled position. It is preferred, however, that the skirt extend about the entire periphery of the opening and the panel, such that the skirt also overlies the outer faces of the endwalls 24 at least to some extent. While this full periphery is preferred, it may still be most preferable for the skirt to at least be longer on the sides overlying the sidewalls 12, as shown in FIG. 2, for reasons noted below.

The skirt will include a plurality of slots 38 which are located to receive the mounting tabs 23 when in the assembled condition of FIG. 3. Due to the rigid nature of the tabs 23 as discussed above, the skirt 37 must deflect over the tabs, and then resiliently regain its original shape to cause the slots to receive the tabs. As such, the skirt is preferably formed of a plastic or similar material. Additionally, it is this need for deflection which makes the greater length over the sidewalls, noted above, preferable. To assist in the deflection, the tabs will preferably be angled downward, as shown in the figures.

While the skirt must be sufficiently resilient to permit this deflection, the skirt must also be rugged. In particular, the skirt must maintain its connection to the housing during inflation of the cushion, and in particular the rupture of the frangible portion and the resultant force upon the skirt.

As may be envisioned from review of FIG. 3, upon activation the gas generator 15 will produce a quantity of gas which flows into the cushion 14. This causes the cushion to inflate and expand, filling the cavity 18 and pressing against the inner face 36 of the cover panel 31. With continued gas generation and inflation the cushion exerts a force against this inner face.

As noted above, the cover includes a frangible portion. In the embodiment shown, this frangible portion takes the form of a set of reduced thickness (and therefore reduced strength) lines 39 in the panel 31. These lines extend into the inner face 36 of the panel, and have an H-shaped configuration, as best shown in FIG. 2. As is known in the art, the force of the inflating cushion will cause these reduced strength lines to rupture, forming an opening through the panel 31 through which the cushion 14 may continue to expand. Various other frangible arrangements could of course be used, such as reduced thickness lines in the panel having other shapes, or reduced thickness lines at the junction of the panel 31 and skirt 37, such that the entire panel 31 is removed. As is known in the art, if the entire panel is removed it is necessary for a tether to extend from the panel to the skirt to prevent the removed panel from contacting the passenger.

From the above description it may be seen that the skirt must therefore be sufficiently rugged to maintain its mounting on the housing against the force of the cushion, at least up to a force at which the frangible portion will rupture. This of course also applies to the tabs 23 on the housing. With the present arrangement of forming the slots 38 in the skirt, as opposed to forming the tabs on the skirt, only tensile stresses pass through the skirt material. As such, an appropriate thickness of commonly used materials (such as the plastics noted above) may provide a sufficient margin of safety to assure that the skirt will not fail. Alternatively, a metal reinforcing member (not shown) could be molded into the skirt adjacent to, or surrounding, the slots 38.

From the above description it may be seen that the use of the extruded and notched housing along with the slotted cover skirt provide a simple attachment scheme which is also quite strong to provide increased safety against the cover contacting the passenger. Additionally, this arrangement provides simplified assembly. Specifically, the cover need only be placed above the housing, and then moved downward in pure translation. This assembly method reduces the complexity of the assembly equipment and the time required to assemble, both reducing costs.

To further improve the cover attachment, it is preferred that the slots 38 are sized to be an appreciable amount larger than the mating tabs 23. As may be envisioned, this will permit the cover to float or move with respect to the housing within limits. This permits the cover to be more accurately positioned with respect to the cabin element 33.

With reference to FIG. 3, it is seen that the structural member 29 is rigidly spaced from the cabin element 33. The housing is mounted to the member 29, the cover 30 is mounted to the housing, and the cover is in turn abutting against an outer face of the cabin element. In practice, the exact distance between the cabin element and the structural member will vary from vehicle to vehicle due to tolerance build-up. As such, even if all the housings and covers for these vehicles were identical, the cover 30 would not abut perfectly against all the cabin elements. In practice, however, tolerance build-up will also be present in the housings and covers. As such, it is even more difficult to cause the cover to properly abut against the housing element.

However, by forming the slots 38 larger than the tabs 23, the cover may be moved into abutment with the cabin element regardless (within limits) of the various tolerances. In this manner the cover will provide a better fit against the cabin member to improve cabin aesthetics.

As may be envisioned, this floating of the cover will permit the cover to move into the proper position against the cabin element, but also would permit the cover to move out of this position. As such, it is desirable to provide an arrangement to secure the cover to the cabin element. This is done by providing the cover element, and in particular the skirt 37, with a plurality of placement tabs 40.

As is best shown in FIG. 2, the tabs 40 are cantilevered protrusions extending peripherally outward from the skirt 37, and are preferably formed as monolithic portions of the cover 30. The tabs 40 are spaced from the inner face 36 of the panel 31. This spacing is set to be approximately equal to the thickness of the cabin element 29 at the periphery of the opening 35. The length of the tabs may be set to permit the tabs to resiliently deform a sufficient amount to pass through the opening 35 in the cabin element, and then regain their original shape to retain the peripheral edge of the opening 35 between the tab 40 and the panel 31. Alternatively, the skirt alone, or skirt and tabs 40 both may flex to permit the passage.

The vertical (with respect to the figures) placement of the tabs 40 relative to the slots 38 may also be important if the skirt is to flex to permit their attachment to the cabin element. As may be envisioned, in order to fit the mounting tabs 23 into the slots 38 the skirt 27 must flex outwardly. However, to fit the placement tabs 40 over the opening 25 in the cabin element the skirt must flex inwardly. This will be of little consequence if the cover 30 is to be applied to the housing 10 prior to insertion into the opening 25. However, for application of the cover to the housing and the cabin element simultaneously, these conflicting flexures may require a particular vertical placement.

Specifically, as shown in FIGS. 2 and 3, it may be desirable to form the slots 38 at a distance from the panel 31 which is greater than the distance between the placement tabs 40 and the panel. In this manner the tabs 40 and slots 38 will be a greater distance apart (in the direction of cover attachment, i.e., downward) and thus greater flexure of the skirt is possible. This difference in spacing may additionally become so large that the mounting tabs 23 have been fully received within the slots 38 prior to the tabs 40 becoming flexed by the opening 35.

The tabs may have a relatively small thickness in the peripheral direction, but be provided in sets of two or more, such as the sets of three shown in FIG. 2. The tabs (or sets of tabs) are peripherally spaced about the skirt such that the tabs will sufficiently hold the cover in position upon the cabin element. To sufficiently hold the cover in position it is typically necessary that the tabs be spaced over a majority of the peripheral length of the panel 31. In the embodiment shown this results in tabs on each face of the rectangular periphery of the cover (i.e., the entire peripheral length).

With this arrangement the cover 30 is secured to the cabin member 33 in the proper position, and therefore provides the desired aesthetics. Additionally, the attachment of the cover using these tabs requires only that the cover 30 be placed over the opening 25, and then moved downward in pure translation. This assembly method reduces the complexity of the assembly equipment and the time required to assemble, both reducing costs. When used in conjunction with the enlarged slots noted above, this arrangement provides the greatly simplified assembly and improved aesthetics, along with absorbance of the tolerance build-up noted above. Furthermore, using this along with the extruded and notched tabs 23 provides the above features plus the improved safety against detachment of the cover during inflation. Additionally, it is noted that the need for only translation to secure the tabs permits the cover to be attached prior to the completed module being secured to the cabin element, or the housing alone may be placed and then the cover attached to the housing and the cabin element simultaneously.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A cover attachment arrangement for an air bag module, comprising:

a housing constructed and arranged to be secured to a structural element of a vehicle, said housing defining a chamber containing a cushion operatively connected to a gas generator, said housing including a plurality of mounting tabs extending therefrom;

a cover having a main panel with a periphery and a skirt having a rectangular periphery extending from said panel, said skirt sized to fit through an opening in a cabin element of the vehicle, said skirt including a plurality of slots, each said slot receiving an associated one of said mounting tabs, each said slot being larger than said associated tab to permit said cover to move with respect to said housing, and a plurality of placement tabs extending from said skirt, at least one of said placement tabs extending from each edge of said rectangular skirt, said placement tabs being spaced from said panel a distance to receive a peripheral edge of the opening in the cabin element of the vehicle.

2. A cover attachment arrangement for an air bag module, comprising:

a housing constructed and arranged to be secured to a structural element of a vehicle, said housing being formed by a generally U-shaped extrusion defining a chamber therein containing a cushion operatively connected to a gas generator, each leg of said U-shaped housing including a monolithically extruded tab flange extending laterally outward therefrom, with said flanges having been notched at longitudinally spaced locations to therefore define a plurality of mounting tabs;

a cover having a main panel with a periphery and a skirt extending from said panel, said skirt sized to fit through an opening in a cabin element of the vehicle, said skirt including a plurality of slots, each said slot receiving an associated one of said mounting tabs, each said slot being larger than said associated tab to permit said cover to move with respect to said housing, and a plurality of placement tabs extending from said skirt, said tabs being constructed and arranged to abut against an underside of said cabin element to assist in securing said cover to said cabin element.

3. The arrangement of claim 2, wherein said skirt has a substantially rectangular periphery.

4. The arrangement of claim 3, wherein at least one of said placement tabs is present on each edge of said rectangular periphery.

5. The arrangement of claim 2, wherein said slots are spaced from said panel a distance which is greater than said spacing of said placement tabs from said panel.

6. An air bag module mounting arrangement, comprising:
 a vehicle, including:
  a passenger compartment, said compartment including a cabin element having an opening extending therethrough, and
  a structural element located in proximity to said opening, the exact relative locations of said opening in said cabin element and said structural element being within a range of dimensional tolerance; and an air bag module, including
  a housing rigidly secured to said structural element but not rigidly secured to said cabin element, said housing defining a chamber containing a cushion operatively connected to a gas generator, said chamber being positioned for said cushion to expand through said opening upon inflation, and
  a cover having a main panel rigidly secured to said cabin element in overlying relation to said opening but not secured to said structural element, said cover further including a skirt depending from said panel and secured to said housing for limited relative motion with respect to said housing about an entire periphery of said cover, said motion being at least equal to said dimensional tolerance between the relative locations of said structural element and said opening in said cabin element.

7. The mounting arrangement of claim 6, wherein said skirt includes a plurality of peripherally extending placement tabs, and a peripheral edge of said opening in said cabin element is received between said panel and said tabs to thereby rigidly secure said panel to said cabin element.

8. The mounting arrangement of claim 7, wherein said panel includes a frangible section which ruptures upon inflation of said cushion.

9. The mounting arrangement of claim 6, wherein said skirt has a substantially rectangular periphery, and at least one of said placement tabs is located upon each edge of said rectangular periphery.

10. The mounting arrangement of claim 6, wherein said housing includes a plurality of mounting tabs extending therefrom, and said skirt includes a plurality of slots, each slot receiving an associated one of said tabs, said slots being larger than said tabs to permit said limited motion.

11. The mounting arrangement of claim 10, wherein said housing is an extruded generally U-shaped element, and wherein each arm of said U-shape includes a monolithically extruded laterally extending flange which has been notched at longitudinally spaced locations to thereby define said tabs.

12. The mounting arrangement of claim 11, wherein said skirt includes a plurality of peripherally extending placement tabs, and a peripheral edge of said opening in said cabin element is received between said panel and said tabs to thereby rigidly secure said panel to said cabin element.

13. The mounting arrangement of claim 12, wherein said panel includes a frangible section which ruptures upon inflation of said cushion.

14. The mounting arrangement of claim 12, wherein said skirt has a substantially rectangular periphery, and at least one of said placement tabs is located upon each edge of said rectangular periphery.

15. The mounting arrangement of claim 14, wherein said cabin element is a dashboard.

16. The arrangement of claim 14, wherein said slots are spaced from said panel a distance which is greater than said spacing of said placement tabs from said panel.

17. The arrangement of claim 2, wherein said placement tabs are spaced from said panel a distance to receive a peripheral edge of the opening in the cabin element of the vehicle, such that said placement tabs assist said panel in securing said panel to said cabin element.

18. A cover attachment arrangement for an air bag module, comprising:
 a housing constructed and arranged to be secured to a structural element of a vehicle, said housing defining a chamber containing a cushion operatively connected to a gas generator, said housing including a plurality of mounting tabs extending therefrom;
 a cover having a main panel with a periphery and a skirt having a rectangular periphery extending from said panel, said skirt sized to fit through an opening in a cabin element of the vehicle, at least two parallel sides of said skirt including a plurality of slots, each said slot receiving an associated one of said mounting tabs, each said slot being larger than said associated tab to permit said cover to move with respect to said housing, and a plurality of placement tabs extending from said skirt, said tabs being constructed and arranged to abut against an underside of said cabin element to assist in securing said cover to said cabin element, and said slots being spaced from said panel a distance which is greater than a spacing of said placement tabs from said panel.

\* \* \* \* \*